(12) United States Patent
Levin et al.

(10) Patent No.: US 6,672,252 B2
(45) Date of Patent: Jan. 6, 2004

(54) PET CHEW

(75) Inventors: Mark Levin, Papillion, NE (US); Joel S. Adamson, Carter Lake, IA (US)

(73) Assignee: Sergeant's Pet Products, Inc., Omaha, NE (US)

( * ) Notice: Subject to any disclaimer, the term of this patent is extended or adjusted under 35 U.S.C. 154(b) by 0 days.

(21) Appl. No.: 10/062,825

(22) Filed: Jan. 31, 2002

(65) Prior Publication Data

US 2003/0168020 A1 Sep. 11, 2003

(51) Int. Cl.7 .................................................. A01K 29/00
(52) U.S. Cl. ........................................ 119/709; 119/710
(58) Field of Search ................................ 119/709, 707, 119/710, 711; 446/386; 426/92, 574, 576, 635, 641, 805

(56) References Cited

U.S. PATENT DOCUMENTS

| | | | |
|---|---|---|---|
| 4,260,635 A | 4/1981 | Fisher | |
| 4,364,925 A | 12/1982 | Fisher | |
| 4,513,014 A * | 4/1985 | Edwards | 426/132 |
| 5,033,410 A * | 7/1991 | Sigurdsson | 119/710 |
| 5,215,038 A | 6/1993 | O'Rourke | |
| 5,296,209 A | 3/1994 | Simone et al. | |
| 5,329,881 A | 7/1994 | O'Rourke | |
| 5,339,771 A * | 8/1994 | Axelrod | 119/710 |
| 5,407,661 A | 4/1995 | Simone et al. | |
| 5,419,283 A * | 5/1995 | Leo | 119/709 |
| 5,467,741 A | 11/1995 | O'Rourke | |
| 5,477,815 A | 12/1995 | O'Rourke | |
| 5,665,152 A | 9/1997 | Bassi et al. | |
| 5,711,254 A | 1/1998 | O'Rourke | |
| 5,797,353 A * | 8/1998 | Leopold | 119/710 |
| 6,126,978 A * | 10/2000 | Axelrod | 426/285 |
| 6,180,161 B1 * | 1/2001 | Axelrod | 426/623 |
| 6,200,616 B1 | 3/2001 | Axelrod et al. | |

* cited by examiner

Primary Examiner—Yvonne Abbott
(74) Attorney, Agent, or Firm—Poisinelli Shalton & Welte, P.C.

(57) ABSTRACT

The present invention relates to a pet chew composition that is ductile and holds inclusions, such as fibers, hard components, and mixtures thereof. Any of a variety of polymeric materials can be used, as long as the resultant pet chew is sufficiently ductile and can hold the tooth-cleaning components in contact with a tooth, while a pet's teeth penetrate the polymer, or as the pet rubs its teeth on the polymer, while gnawing or chewing on the resultant pet chew.

34 Claims, No Drawings

PET CHEW

FIELD OF INVENTION

The present invention relates to a ductile pet chew having inclusions, preferably a tooth-cleaning component, and a method for forming the pet chew. In particular, the pet chew is formed from a ductile substrate material and either a fibrous component, a hard component, or both.

BACKGROUND OF INVENTION

Pet chews have been known for quite some time. A pet chew is a product that is intended to occupy an animal that may, or may not, be consumed. In particular, some pet chews are food-like products, which may have some nutritional value, and are often intended to clean a animal's teeth. Known pet chews are both hard and soft. Hard chews tend to be used in teeth cleaning by having the animal bite down on the chew to cause friction and to resultingly clean the teeth. Soft chews are intended to clean teeth and to occupy the animal's time by having the animal gnaw on the pet chew for a sustained period of time. Dogs are known to enjoy the chewing of such products.

A variety of different products are used to make pet chews of varying hardness. For example, in the past, pet chews have been made from animal hide. Animal hide chews, however, have a number of disadvantages associated therewith. In particular, animal hide can produce a foul odor as a result of being chewed. Moistening, as a result of chewing, will cause the hide to soften and degrade, whereby the chews can smear and stain carpets and furniture. More problematic, the rawhide can swell and cause blockage in an animal. Additionally, the animal hide or raw hide can harbor bacteria, which can multiply in the mouth of an animal and be passed on to children, elderly people, or the immune impaired. As such, chews made from rawhide have been replaced by compositions that are "man made," such as various starch and plastics based compositions.

Of the known developed compositions for use as an animal chew, most are either made from starch, protein, or mixtures thereof. Like the rawhide chews, the starch composition chews also have a number of problems associated therewith. Starch compositions are known to readily degrade in water, which means that during chewing, they become very "mushy" and can dissolve. Also, starch compositions readily dehydrates if left exposed to the environment for any length of time and resultantly can splinter or shatter. The crystalline nature of the starch polymers causes this shattering or splintering effect. Such splinters can poke or cut the animal and, thus, are undesired. For this reason, it is desired to have a chew that does not readily breakdown when moistened, or be prone to shatter when removed from its package and allowed to dry under ambient conditions. It is further desired to not have a chew that after moistening dries out and cracks.

Plastic or nylon animal chews do not suffer from degradation when exposed to moisture, nor do they dehydrate and readily splinter. However, plastic animal bones tend to be non-digestible, which is undesired. It is further believed that most consumers do not like the idea of having a animal consume synthetic plastic or petroleum-based products. As such, it is desired to have a chew that is perceived to be "natural."

Finally, other known animal chews are hard and brittle, which resultantly causes the chews to readily crumble. This type of chew is consumed quickly. Although these chews tend to be effective in cleaning teeth, they have a short-lived cleaning action. The duration of cleaning is directly tied to the length of time the crumbled material is in contact with the teeth. Thus, it is desired to have a animal chew that will not only clean teeth, but will have a cleaning action, which continues for an extended period of time.

It is preferably desired to have a chew that does not readily crumble, degrade in water, and does not pose a hazard by shattering or splintering. It is also preferred that the chew exhibit an extended duration of tooth-cleaning. Another preferred, but not required, characteristic, is that the chew be digestible. It is further preferred if the animal chew is made from natural materials, or at least perceived to be natural, and not made from synthetic or plastic materials.

SUMMARY OF INVENTION

The present invention relates to a pet chew composition formed from a polymeric material and an amount of inclusions. Specifically, the pet chew is ductile so that when chewed, an animal's teeth will sink into the chew without tearing or breaking apart the composition. The ductility characteristics of the pet chew are important because this allows the chew to be held in contact with the animal's teeth. A polymeric material is a composition that includes at least one polymer, and may include additional additives. Polymeric material, polymers, and substrate material will be used interchangeably throughout the present application. A polymer is a macro-molecule having five or more monomers.

As stated, included in the polymeric composition will be inclusion members. Preferably, the inclusions are either hard components or fibers. The inclusions are preferred for use in cleaning the animal's teeth. Any of a variety of different types of fibrous materials may be used, including synthetic and natural fibers. The fibers, however, must have a length of greater than 900 microns. Any constituent can be used as a hard component, as long as it has a hardness greater than 0.5 Mahs. More preferably, the inclusion will have a hardness greater than 2.0 Mahs. Among the hard components that may be used with the present invention are various types of grains and legumes, as well as minerals and synthetic materials.

The polymeric material can be any of a variety of compositions, as long as it satisfies the ductility characteristics of the present invention, can retain the inclusions, and can be molded into any of a variety of different shapes or structures. It is most preferred if the polymeric material has a water activity of less than 0.9, and a total moisture content equal to or less than 25% by weight. It is also preferred if the polymeric material is edible. Most preferably, the polymeric material is either a starch or protein based composition.

Any of a variety of methods can be used to form the pet chew, as long as a chew composition of any of a variety of shapes and sizes may be formed. Among the suitable formation methods are injection molding, extrusion, rotary molding, compression molding, and sheet casting.

The present invention is advantageous for a number of reasons. In particular, the present invention is well suited for cleaning various animals' teeth, because the fibers and hard inclusions are held in contact with the animal's teeth during the chewing process. As such, a dual cleaning action is achieved because the ductile polymers rub against the teeth, and the inclusions contact the teeth. Additionally, the present invention is preferred because it is, preferably, digestible and does not significantly swell in the stomach of an animal. The present invention does not readily break down due to exposure to moisture, and, therefore, does not stain or damage furniture or carpets.

DETAILED DESCRIPTION

The present invention relates to a pet chew composition formed from a substrate material and an amount of an inclusion component, wherein the pet chew is ductile so that an animal's teeth, in particular, a dog's teeth, can penetrate into the chew. The inclusion is preferably a tooth-cleaning component. The chew is such that it does not readily crumble, break, or tear, but requires multiple chews or compressions to break down. Importantly, the ductile character of the chew causes the tooth-cleaning components to be held in contact with the animal's teeth. This results in a cleaning action of the animal's teeth, which is superior to the rubbing action of the ductile material alone. The substrate can be any of a variety of materials that are ductile as described herein. The tooth-cleaning constituents should be somewhat abrasive and hard to thereby rub tarter off of the animal's teeth and to resultingly clean the teeth. The present invention also relates to a method for producing the pet chew.

The composition of the chew is such that it contains inclusions, preferably, hard components, or fibrous components which, when rubbed against the animal's teeth, will result in a cleaning effect. The substrate composition used to form the pet chew can be any of a variety of constituents, as long as the pet chew is ductile and can readily hold the inclusions. The inclusions or compound will work in conjunction with the ductile substrate material to perform as a tooth-cleaning component or components. As stated, it is necessary for the substrate composition, which is used to form the pet chew, to have a ductile quality. Ductility is defined as a cohesive material whose shape can be modified under force or after being stretched, and has a propensity to return to its original shape, while also showing resistance to fracturing. Such ductility also causes the tooth-cleaning components to be held in contact with the animal's teeth, while the teeth rub on the substrate composition, or as the teeth penetrate the substrate composition. In particular, the substrate should be such that the animal's teeth will penetrate the pet chew so that one or more of the teeth, or a portion of the teeth, are temporarily surrounded by or slightly penetrate the chew. Once the teeth are removed from the chew, it should return to its original shape, or to a shape substantially similar thereto. Any of a variety of substrate materials may be selected. Most preferably, the substrate is a polymeric material.

Ductility is not directly quantified by any sort of measurement but is, instead, quantified by a cumulative measurement of the tensile strength, flexular strength, shear strength, hardness, and penetration characteristics of a composition (the pet chew). As such, it is preferred for the finished polymeric composition or substrate to have a tensile strength ranging between 200 psi and 1050 psi. More preferably, the composition will have a tensile strength equal to between 200 psi and 750 psi. Flexural strength of the composition should range between 3 lbs. and 75 lbs., which causes a ½ inch deflection. The shear strength should range between 80 lbs. and 175 lbs. The hardness of the composition should measure between 68 and 90 rockwell. The penetration characteristics of the polymeric composition should measure between 2 lbs. and 28 lbs. The above measurements are derived using the methods disclosed in Example 6 herein.

The particular characteristics of the chew can be controlled such that the ductility characteristics can be changed based on the desired finished characteristics. As a result of the wide variations in chewing aggressiveness between different animals and breeds of animals, it is desired to have a range of ductile characteristics. It is also desired for the consumable chews to be such that ductile characteristics can be changed to provide for various chew durations by a typical animal. Thus, the chew can be constructed such that it has a greater or shorter longevity dependant upon the desired final use.

It is preferred, but not required, that the polymeric material is edible and digestible by the animal, and does not readily degrade in water. The polymeric material should also be capable of being formed into a desired shape. This can be accomplished through injection molding or an extrusion process, as well as a co-extrusion process. Finally, it is necessary for the polymeric material to be such that it readily retains and holds various inclusions, especially tooth-cleaning components, such as fibers and hard components.

Suitable polymeric materials for use in forming the pet chew can be selected from protein polymers, starch polymers, plastic polymers, rubber, non-digestible natural products, and other human-made materials (including nylon, polyester, and polylactic acid), and combinations thereof. The polymer or polymeric material will be comprised of at least one type of polymer, and will include additives, such as flavors, plasticizers, and preservatives. It is most preferred to use a polymer made from either a protein polymer, a starch polymer, or combinations thereof, because these tend to be consumable and are considered natural by pet owners. Such polymers are, typically, readily digestible by an animal. Polymers high in protein are preferred for use if it is desired to form a chew that does not breakdown, soften, or dissolve in water. The protein polymers may be derived from protein fractions found in wheat, soy, corn, barley, and other types of seeds, vegetables, or plants. A preferred protein is derived from wheat. Starch compositions are typically used for pet treats or chews exhibiting short chew lives or chews intended to be very hard. Although there are a variety of starch types and sources for starch, a preferred starch is one that is not chemically modified and contains significant levels of amyl pectin. A preferred source would come from the group consisting of wheat, tapioca, corn, rice, maize, potato, other plant starches, or blends thereof. Also, carbohydrates, other than starches, may be used. It should be noted that chemical and physical modifications of the polymer or polymer base can improve ductile characteristics.

In order to ensure that the polymeric material has sufficient ductility, it is often required to add a softener, or plasticizer, constituent. A preferred plasticizer is a humectant that binds water. Any of a variety of other plasticizers, however, may be used, as long as the resultant polymeric material has the above-mentioned characteristics. Typically, the plasticizer constituent will be added to the polymeric material in an amount equal to between about 10% and 65% by weight of the polymeric or substrate material. This amount may vary, however, dependent upon the particular polymeric material, the particular plasticizer, and the desired finished characteristics of the chew. As before, it is preferred if the plasticizer is readily digestible by the animal, or passes through the animal with no ill side effects.

A variety of different materials may be used as inclusion components found in the pet chew. The inclusions, preferably work with the polymer to clean teeth, and may be either a fibrous component, a hard component, or mixtures thereof.

Any of a variety of fibrous materials may be used, as long as the fibrous materials have a length of at least 900 microns. More preferably, the fibers will have a length of at least 1,000 microns. Even more preferred, is a length ranging between 1,800 microns and 2,500 microns. The stated length of the fiber is necessary, as this has been found to be the most preferred way to provide improved cleaning action of the animal's teeth. Any of a variety of fibrous materials may be used, including cellulose, sisal, cotton, and any of a variety of synthetic fibers. The synthetic fibers include polyester, nylon, olefin, and any other synthetic fiber. As before, it is preferred if the fibrous material is of a natural origin. The fibers can be added in an amount equal to between 1% and 15% by weight of the polymeric material. Preferably, the fibers are added in an amount equal to between 4% and 8% by weight of the polymeric material.

Any of a variety of hard particles, or particulates, may be used as inclusions and teeth cleaning components. In general, the hard particle materials will scrape against the tooth of the animal and, thereby, remove tartar and clean the animal's teeth. A variety of different synthetic, natural, and manufactured hard particle materials may be used. As before, it is most preferred if the hard particle materials are of a natural origin, or made from natural materials. Thus, the most preferred hard components are selected from the group consisting of whole or broken dried cereal grains and legumes, such as rice, wheat, oats, corn, soybeans, peas, and other particulates. The hard particles are added in an amount equal to between 5% and 45% by weight of the substrate material. The particles are more preferably added in an amount equal to between 10% and 35% by weight of the substrate material. Even more preferably, the particles are added in an amount equal to between 15% and 25%. The particles should range in size from between 2 mm×5 mm to 400 mesh or 37 microns. The particles will have a hardness of at least 0.5 Mahs and, more preferably, between 2.0 and 9.0 Mahs. Optionally, various mineral powders may be used with the present invention.

The resultant pet chew will be comprised of between 50% and 95% by weight of polymeric material, more preferably 70% and 90% by weight. Polymeric material means the polymer or polymers that form the chew, as well as the additives, except for the fibers and inclusions. Preferably, the pet chew will have a water activity level equal to or less than 0.9, and a moisture content equal to or less than 25% by weight.

To form the pet chew, there are two preferred processes for melting the polymeric material and shaping it, depending on the desired shape and appearance. Injection molding is used for a more three dimensional shape, while extrusion is used for co-extrusion, or two dimensional shape. Such injection molded shapes include bone-shaped, pet treat-shaped, and toy-shaped structures, and those shapes made by extrusion processes, which include cookie-type shapes, bar-type shapes, and multi-textured, colored, or flavored shapes. Generally, the temperature for melting the starch or protein polymeric material will range between 155° F. and 210° F. For polymeric materials high in protein, it is necessary to thermal set the pet chew after shaping. This can be accomplished by heating with hot air, steam, or ionized energy. Other methods for thermal setting extruded pet chews include dipping in hot oil or boiling water. Preferably, the chews are cured after extrusion. This includes thermal settings and drying. An alternative to extruding the chews is to injection mold the polymeric material.

In the alternative, a leavening agent or gas producing compound can be added, such as a bicarbonate.

The following examples are for illustrative purposes only and are not to be construed as limiting the scope of the subject invention.

EXAMPLES

Example 1

A polymeric blend was extruded into a animal chew. It was desired to develop a formula that was ductile in nature and could hold either hard components or fibers for use in cleaning teeth. A suitable protein polymer was developed and is of the dry formula listed below:

| Constituent | % By Weight |
| --- | --- |
| Wheat Protein | 87.87 |
| Flavor | 4.36 |
| Sodium Tri-metaphosphate | 2.49 |
| Cellulose Powder | 2.49 |
| Mono and Diglycerides | 1.40 |
| Magnesium Stearate | 0.80 |

A liquid mixture was then added to the above dry constituents. The liquid mixture was a plasticizer comprising of 0.126 pounds (lbs.) of metabisulfite, 23 lbs. of propylene glycol, and 2.52 lbs. of water. The wheat gluten is a protein polymeric material. The powder is a processing aid. The glycerol compounds were added as plasticizers to increase ductility of the product.

The pellets formulated according to the above formula were extruded into a animal chew. The chew was extruded using known procedures recited herein. It was observed that an excellent animal chew was produced. In particular, the chew was edible and ductile, and did not readily degrade in water.

Example 2

The protein polymer, from Example 1, was extruded three times to see if a ductile chew bone could be formed through an extrusion process. The test was also to determine if a co-extrusion process could be practiced. A Wenger TX-57 extruder was used to extrude the skin, and a Wenger X-85 extruder was used to extrude the inside layer. The three tests involved extrusion of 200 lb. batches.

| Outside Layer | Inside Layer | Comments |
| --- | --- | --- |
| Protein Polymer | Protein Polymer | No additives |
| Protein Polymer | Protein Polymer | with bicarb - 200 lb. batch with 1.5% by weight baking powder |
| Protein Polymer | Protein Polymer | with Rice - 20% by weight addition both outside and inside |

It was observed that co-extrusion of protein polymers was possible with no unique capital beyond equipment to converge flows. Flows of the protein polymer held together well if the material was not heat injured in the process. Also, a pet chew was formed in a bone shape that held hard components, such as rice. The animal bones of all three extrusion processes had suitable ductility. This Example demonstrated that protein polymers could be co-extruded with hard inclusions. The tests also showed that bicarbonate could be added to the extruded composition to produce a unique texture.

Example 3

The following formulations were made and tested to determine suitable starch-based formulations for forming a pet chew using various ratios of wheat, tapioca, and rice flour mixed with humectants. These formulations were evaluated through co-extrusion processes. The composition of the various formulations are listed below. The numbers used to label the formulations are arbitrary.

| SKIN | #1 | #2 | #3 | #4 | #5 | #6 | #7 |
|---|---|---|---|---|---|---|---|
| Wheat Flour | 88.65 | 84.65 | 42.33 | 38.33 | 37.33 | 37.33 | 28.33 |
| Rice Flour | 0.00 | 0.00 | 42.32 | 38.32 | 37.32 | 37.32 | 28.32 |
| Wheat Gluten | 0.00 | 0.00 | 0.00 | 8.00 | 0.00 | 0.00 | 8.00 |
| Sodium Casienate | 0.00 | 0.00 | 0.00 | 0.00 | 10.00 | 0.00 | 10.00 |
| Soy Protein Concentrate | 0.00 | 0.00 | 0.00 | 0.00 | 0.00 | 10.00 | 10.00 |
| Gelatin 250 Bloom | 0.00 | 4.00 | 4.00 | 4.00 | 4.00 | 4.00 | 4.00 |
| Corn Syrup | 4.00 | 4.00 | 4.00 | 4.00 | 4.00 | 4.00 | 4.00 |
| Propylene Glycol | 4.00 | 4.00 | 4.00 | 4.00 | 4.00 | 4.00 | 4.00 |
| Fat (tallow) | 1.50 | 1.50 | 1.50 | 1.50 | 1.50 | 1.50 | 1.50 |
| Potassium Sorbate | 0.30 | 0.30 | 0.30 | 0.30 | 0.30 | 0.30 | 0.30 |
| Phosphoric Acid | 0.80 | 0.80 | 0.80 | 0.80 | 0.80 | 0.80 | 0.80 |
| Mono Glyceride | 0.75 | 0.75 | 0.75 | 0.75 | 0.75 | 0.75 | 0.75 |
| TOTAL | 100.00 | 100.00 | 100.00 | 100.00 | 100.00 | 100.00 | 100.00 |

| CENTER: | #1 | #2 |
|---|---|---|
| Wheat Flour | 84.20 | 39.10 |
| Rice Flour | 0.00 | 39.10 |
| Sugar | 4.00 | 4.00 |
| Corn Syrup | 2.50 | 2.50 |
| Propylene Glycol | 3.00 | 3.00 |
| Caramel Color | 2.00 | 2.00 |
| Potassium Sorbate | 0.30 | 0.30 |
| Phosphoric Acid | 0.00 | 1.00 |
| Gelatin | 0.00 | 4.50 |
| Mono Glyceride | 0.00 | 0.50 |
| Fat (tallow) | 3.00 | 3.00 |
| TOTAL | 100.00 | 100.00 |

Formula #13

Dry as % of Formula: 89.70%
Slurry as % of Formula: 10.30%

| Total From Formula (500 lbs) | Ingredient | Dry Mix | Slurry | Other Ing |
|---|---|---|---|---|
| 0.00% | Wheat Flour | 0.00% | | |
| 72.90% | Tapioca Flour | 81.27% | | |
| 0.00% | Sodium Casienate | 0.00% | | |
| 8.00% | Wheat Protein | 8.92% | | |
| 0.00% | Soy Protein Concentrate | | | |
| 4.00% | Gelatin | | | |
| 0.00% | Salt | 0.00% | | |
| 0.30% | Potassium Sorbate | 0.33% | | |
| 4.00% | Corn Syrup Solids | | | |
| 0.50% | Myvaplex | 0.56% | | |
| 4.00% | Corn Syrup | | 38.83% | |
| 4.00% | Propylene Glycol | | 38.83% | |
| 1.50% | Poultry fat w/Naturox | | 14.56% | |
| 0.80% | Phosphoric Acid | | 7.77% | |
| 0.00% | Caramel Color | | 0.00% | |
| Total: 100.00% | | | | |

Formula #14

Dry as % of Formula: 89.70%
Slurry as % of Formula: 10.30%

| Total From Formula (500 lbs) | Ingredient | Dry Mix | Slurry | Other Ing |
|---|---|---|---|---|
| 0.00% | Wheat Flour | 0.00% | | |
| 72.77% | Tapioca Flour | 81.13% | | |
| 0.13% | Sodium Metabisulfite | 0.14% | | |
| 8.00% | Wheat Protein | 8.92% | | |
| 0.00% | Soy Protein Concentrate | | | |
| 4.00% | Gelatin | | | |
| 0.00% | Salt | 0.00% | | |
| 0.30% | Potassium Sorbate | 0.33% | | |
| 4.00% | Corn Syrup Solids | | | |
| 0.50% | Myvaplex | 0.56% | | |
| 4.00% | Corn Syrup | | 38.83% | |
| 4.00% | Propylene Glycol | | 38.83% | |
| 1.50% | Poultry fat w/Naturox | | 14.56% | |
| 0.80% | Phosphoric Acid | | 7.77% | |
| 0.00% | Caramel Color | | 0.00% | |
| Total: 100.00% | | | | |

Formula #11

Dry as % of Formula: 89.70%
Slurry as % of Formula: 10.30%

| Total From Formula (500 lbs) | Ingredient | Dry Mix | Slurry | Other Ing |
|---|---|---|---|---|
| 80.90% | Wheat Flour | 90.19% | | |
| 0.00% | Rice Flour | 0.00% | | |
|  | Sugar | 0.00% | | |
| 0.00% | Wheat Protein | 0.00% | | |
| 4.00% | Corn Syrup Solids | 4.46% | | |
| 4.00% | Gelatin | 4.46% | | |
| 0.00% | Salt | 0.00% | | |
| 0.30% | Potassium Sorbate | 0.33% | | |
| 0.75% | Myvaplex | 0.84% | | |
| 4.00% | Corn Syrup | | 38.83% | |
| 4.00% | Propylene Glycol | | 38.83% | |
| 1.50% | Poultry fat w/Naturox | | 14.56% | |

-continued

Formula #11

| From Formula | Ingredient | Dry as % of Formula: Slurry as % of Formula: | | Other Ing |
|---|---|---|---|---|
| Total | | 89.70% | | 10.30% |
| | (500 lbs) | Dry Mix | Slurry | |
| 0.80% | Phosphoric Acid | | 7.77% | |
| 0.00% | Caramel Color | | 0.00% | |

Total: 100.25

Formula #12

| From Formula | Ingredient | Dry as % of Formula: Slurry as % of Formula: | | Other Ing |
|---|---|---|---|---|
| Total | | 89.70% | | 10.30% |
| | (500 lbs) | Dry Mix | Slurry | |
| 72.77% | Wheat Flour | 81.13% | | |
| 0.00% | Rice Flour | 0.00% | | |
| 0.13% | Sodium Metabisulfite | 0.14% | | |
| 0.00% | Wheat Protein | 8.92% | | |
| 0.00% | Soy Protein Concentrate | 0.00% | | |
| 4.00% | Gelatin | 4.46% | | |
| 0.00% | Salt | 0.00% | | |
| 0.30% | Potassium Sorbate | 0.33% | | |
| 0.50% | Myvaplex | 0.56% | | |
| 4.00% | Corn Syrup | | 38.83% | |
| 4.00% | Propylene Glycol | | 38.83% | |
| 1.50% | Poultry fat w/Naturox | | 14.56% | |
| 0.80% | Phosphoric Acid | | 7.77% | |
| 0.00% | Caramel Color | | 0.00% | |

Total: 100.00

Formula #6

| From Formula | Ingredient | Dry as % of Formula: Slurry as % of Formula: | | Other Ing |
|---|---|---|---|---|
| Total | | 88.50% | | 11.50% |
| | (500 lbs) | Dry Mix | Slurry | |
| 71.20% | Wheat Flour | 80.45% | | |
| 0.00% | Rice Flour | 0.00% | | |
| 6.00% | Sugar | 6.78% | | |
| 0.00% | Wheat Protein | 0.00% | | |
| 5.00% | Corn Syrup Solids | 5.65% | | |
| 4.50% | Gelatin | 5.08% | | |
| 1.00% | Salt | 1.13% | | |
| 0.30% | Potassium Sorbate | 0.34% | | |
| 0.50% | Myvaplex | 0.56% | | |
| 2.50% | Corn Syrup | | 21.74% | |
| 3.00% | Propylene Glycol | | 26.09% | |
| 3.00% | Poultry fat w/Naturox | | 26.09% | |
| 1.00% | Phosphoric Acid | | 8.70% | |
| 2.00% | Caramel Color | | 17.39% | |

Total: 100.00%

An Extrutech 325 single screw extruder was used to form the shell. An Extrutech 525 single screw extruder was used to form the center.

The above formulations were evaluated to determine whether starch based polymers could form a suitable pet chew. It was determined that the above formulations formed a chew of suitable ductility. In particular, the above formulations could be used to form a suitable commercial chew.

Example 4

The following combinations were tested to evaluate the use of various fibers and grain inclusions in a ductile polymer. A protein polymer (listed below) was used as the ductile polymer base. The formulations were processed on a Wenger TR85 twin screw, thermal extruder, with an 18:1 L/D barrel ratio. The direct feed rate was 900 lbs/hr-1,000 lbs/hr. The temperature profile of the barrel was controlled to deliver a product temperature of approximately 190° F., coming out of the die. The extruded material was not cut at the die face but conveyed away from the die on a conveyor belt, approximately 10 feet into a rotary cutter. The extruded material was cut into 6" long pieces. Extruded pieces were then heat processed to thermally set the protein polymer. The polymer composition was:

| Constituent | % By Weight |
|---|---|
| Wheat Gluten | 69.93 |
| Flavor | 3.47 |
| Sodium Tri-metaphosphate | 1.98 |
| Solka Flok 900 | 1.98 |
| Mono and Diglycerides | 1.59 |
| Magnesium Stearate | 0.80 |

A liquid mixture was added to the above dry constituents. The liquid mixture had 2.0% water, 0.1% metabisulfite, and 18.3% propylene glycol.

The inclusions added to the polymers are as follows:
1. Control Protein Base Polymer with no additives
2. Protein Base Polymer with chicken digest added, 4% by weight of the polymer.
3. Protein Base Polymer with sisal fiber added, 4% by weight of the polymer.
4. Protein Base Polymer with cotton fiber added, 4% by weight of the polymer.
5. Protein Base Polymer with nylon/polyester fiber added, 2.75% by weight of the polymer.
6. Protein Base Polymer with cellulose fiber added, 4% by weight of the polymer.
7. Protein Base Polymer with brewers rice added, 4% and 10% by weight of the polymer.
8. Protein Base Polymer with wheat added, 10% by weight, chlorophyll 1% by weight, and 4% chicken digest by weight of the polymer.

All fiber types used for these tests were longer than 1 mm in length on average and as long as 2.5 mm on average. The fiber and grain additions were added for dental benefits and rigidity. The fiber also will add sheer strength to the piece as an additional benefit.

All the compositions were extruded in the same way. To develop the proper ductile texture, the protein polymer was thermally set after forming by using three different thermal processes were evaluated: 1) steam; 2) hot convection air 205° F., for 32 minutes; and, 3) hot convection air at 240° F. for 32 minutes. The die shape used for all runs was a small "bone" shape. The use of a belt cutter to keep the extrudate straight after extrusion produced nice straight pieces. All formulations ran fairly well and yielded acceptable products.

It was concluded that an acceptable animal chew could be extruded from the above polymer. Additionally, additives could be included therewith. As such, a desired pet chew with various inclusions was formed.

Example 5

A series of tests were conducted to determine the physical characteristics of various chews. The procedures and standards set forth govern the laboratory testing of the animal chew to define the characteristics of the invention.

The following is a summary of the various tests:

Tensile Test—determined strength in pounds per square inch (psi) of a sample, using a Baldwin Universal Testing Machine, Serial No. 81495. The test provides strength in pounds per square inch (PSI).

The samples were machined into reduced section tension specimens (as per A.S.T.M. A 370). The rectangular tension test specimen samples were reduced in the middle for two (2) reasons. (1) to get an accurate square inch area, and (2) to make sure the sample broke in the middle instead of in the jaws.

Flexural Test—A three (3) point load test to determine flexural strength, using a Baldwin Universal Testing Machine, Serial No. 81495. This three (3) point load test evaluates load verses deflection (not to exceed ½" deflection). Two steel blocks were used for the samples to rest on. The blocks were spaced at four (4) inches. A dial indicator was used to determine the ½" deflection. The Universal Testing Machine was set so the penetrator was just touching the sample. The dial indicator was set to zero. The machine was then loaded to deflect the sample ½", and the load in pounds recorded from the testing machine.

Shear Test—A single shear to determine shear strength, using a Baldwin Universal Testing Machine, Serial No. 81495. Samples were cut into a cubical shape for testing. Two (2) ½-inch plates were used with the same size hole. The plates were placed in the Universal Testing Machine and off-set so the front of one plate matches with the back of the other plate, and the holes were aligned. A rectangle test sample was placed in a round testing hole, then the testing machine, and the load in pounds recorded. Then the pounds were divided by the square inch area to obtain psi of sheer force required to sheer the sample.

Hardness Test—A non-destructive test to measure hardness, using an Equotip 2, Model D, Serial No. 978-0237, reference standard. The Equotip 2 was used to provide the tests because of the ease at which the unit could get into a small area. The scale used was a Rockwell scale. Samples were prepared by sanding or milling a 1"×1" area smooth on both sides of the sample to ensure intimate contact with the steel support blocks and the testing probe. The samples were placed on steel support blocks (3" thick) on a steel table for stability. The sample was coupled to the steel blocks by the use of an ultrasonic gel. Three (3) readings were taken of each piece and then averaged.

Penetration Test—measurement of the load needed to force a $\frac{1}{16}$" diameter rod into the sample $\frac{1}{8}$", using a Baldwin Universal Testing Machine, Serial No. 81495. The penetration test was performed with a stainless steel $\frac{1}{16}$" diameter rod, epoxy cemented into a steel bar. The sample was placed on a 2"×3" steel support block. A dial indicator was used to determine the $\frac{1}{8}$" penetration. The Universal Testing Machine was set so the penetrator was just touching the sample. The dial indicator was set to zero. The machine was then loaded to penetrate the sample $\frac{1}{8}$", and the load in pounds recorded from the testing machine. The test results representing the samples tested were as follows:

| Sample No. | Tensile (psi) | Flexural, lbs. | Shear, lbs. | Hardness "B" | Penetration, lbs. |
|---|---|---|---|---|---|
| 2 | 309 | 60 | 159 | 90 | 24 |
| 3 | 475 | 41 | 125 | 87 | 8 |
| 4 | 270 | 6 | 82 | 72 | 2 |
| 5 | 429 | 37 | 126 | 90 | 10 |
| 6 | 316 | 3 | 96 | 72 | 8 |
| 7 | 205 | 9 | 99 | 70 | 4 |
| 8 | 295 | 10 | 105 | 76 | 3 |
| 9 | 218 | 9 | 105 | 71 | 7 |
| 10 | 283 | 8 | 99 | 75 | 8 |
| 11 | 248 | 8 | 89 | 69 | 5 |
| 12 | 132 | 5 | 87 | 68 | 3 |
| 13 |  | 51 | 172 | 93 | 28 |
| 14 |  |  | 19 | 62 | 5 |
| 16 | 1038 | 76 |  | 75 | 39 |
| 19 | 1724 | 24 |  |  | 27 |
| 20 |  | 30 |  | 94 | 18 |
| 22 |  |  |  | 48 |  |
| 26 |  |  |  | 92 |  |
| 28 |  | 23 |  | 87 |  |
| 29 |  | 69 |  | 84 |  |
| 30 | 641 | 39 | 132 | 92 | 21 |
| 31 | 626 | 24 | 126 | 92 | 19 |

Spaces left blank mean a measurement could not be obtained because the sample was too brittle or too soft.

All samples were tested and demonstrated desired characteristics dependent upon the desired finished use. Sample 16 was ideal for use as a long term chew. Sample 4 was desired for use as a short term chew. The samples tested are described below:

| SAMPLE # | DESCRIPTION |
|---|---|
| 2 | Wheat Flour, starch composition |
|   | Injection Molded |
|   | Zero Compression Screw |
|   | Ambient Dried 18 Hours |
| 3 | Protein Polymer |
|   | Protein Formula #1, from Example 4 |
|   | 245° F.; Hot Air Cured |
| 4 | Protein Polymer |
|   | Protein Formula #1, from Example 4 |
|   | Steam Cured |
| 5 | Protein Polymer |
|   | Protein Formula #1, from Example 4 |
|   | Flavorant added 4% by weight of chicken fat |
|   | Run #10; Hot Air Cured 245° F. |
| 6 | Protein Polymer |
|   | Protein Formula #1, from Example 4 |
|   | Flavorant added 4% by weight of chicken fat |
|   | Run #8, Steam Cured |
| 7 | Protein Polymer |
|   | Protein Formula #1, from Example 4 |
|   | Steam Cured |
| 8 | Protein Polymer |
|   | Protein Formula #1, from Example 4 |
|   | Steam Cured; Cotton fiber, 4% by weight |
| 9 | Protein Polymer |
|   | Protein Formula #1, from Example 4 |
|   | Steam Cured; nylon fiber, 4% by weight |
| 10 | Protein Polymer |
|   | Protein Formula #1, from Example 4 |
|   | Steam Cured; cellulose fiber, 4% by weight |
| 11 | Protein Polymer |
|   | Protein Formula #1, from Example 4 |
|   | Steam Cured; rice, 4% by weight |
| 12 | Protein Polymer (Green) |
|   | Protein Formula #1, from Example 4 |
|   | Run #16; Steam Cured; wheat and chlorophyll, 4% by weight |
| 13 | Health Measures (Hartz) ® |
|   | Dental Chew |
| 14 | Pup-Peroni ® |
|   | Beef and Cheese Twists |
|   | Quantity 8 |
| 16 | Booda ® |
|   | Bacon Flavored Velvets |
|   | Natural Corn Starch |
| 19 | Nylabone ® |
|   | Puppy Bone |
|   | Inert Soft Thermoplastic Polymer, Flavor Impregnated |
| 20 | Pedigree Dentabone ® |
|   | Promote Oral Health |
| 22 | Clean & Chew Toy (Boned Shape) |
|   | Bacon Flavor |
| 26 | Purina T. Bonz ® |
|   | T-Bone Steak Shaped Dog Treat |
|   | Beef Flavor |
| 28 | Co-extruded test sample; Test Run made on |
| 29 | Co-extruded test sample; Test Run made on |
| 30 | Large Dog Chew; chlorophyll and phosphate |
| 31 | Small Dog Chew; chlorophyll and phosphate |

The resulting chews developed according to the present process had superior ductility characteristics. Additionally, the mixtures suitably held inclusions.

Thus, there has been shown and described a method for ductile animal chew that has dental care properties, and a method for producing such animal chew, which fulfills all the objects and advantages sought therefore. It is apparent to those skilled in the art, however, that many changes, variations, modifications, and other uses and applications for the animal chew are possible, and also such changes, variations, modifications, and other uses and applications which do not depart from the spirit and scope of the invention are deemed to be covered by the invention, which is limited only by the claims which follow.

What is claimed is:

1. A ductile pet chew having oral care preparations, comprising:
    (a) an amount of a polymeric material, wherein said polymeric material is ductile, so that said chew has a tensile strength ranging between 200 psi and 1,050 psi, flexular strength ranging between 3 lbs. and 75 lbs., shear strength ranging between 80 lbs. and 175 lbs., hardness between 68 and 90, and penetration between 2 and 28; and,
    (b) inclusions, which are selected from the group consisting of a fiber component, a hard component, and mixtures thereof.

2. The pet chew of claim 1, wherein said polymeric material is equal to between 70% and 90% by weight.

3. A method for forming a pet chew comprising:
    (a) mixing a protein polymeric material with an inclusion constituent to form a mixture;
    (b) melting said mixture; and,
    (c) forming a chew.

4. The method of claim 3, wherein said forming method is selected from the group consisting of injection molding, extrusion, rotary molding, compression molding, and sheet casting.

5. The method of claim 3, wherein said method comprises extruding said polymeric material at a temperature ranging between 180° F. and 210° F., with a screw turning at between 20 rpms and 200 rpms.

6. The method of claim 3, wherein said pet chew is cured.

7. The method of claim 3, wherein said inclusions are selected from the group consisting of a fiber component, a hard component, and mixtures thereof.

8. A method for forming a pet chew comprising:
    (a) mixing a starch polymeric material with an inclusion constituent;
    (b) melting said polymeric material, whereby crystalline starch is converted to gelatinized nature;
    (c) forming a chew; and,
    (d) curing said chew.

9. The method of claim 8, wherein said forming method is selected from the group consisting of injection molding, extrusion, rotary molding, compression molding, and sheet casting.

10. The method of claim 8, wherein said method comprises extruding said polymeric material at a temperature ranging between 180° F. and 210° F., with a screw turning at between 20 rpms and 200 rpms.

11. The method of claim 1, wherein said inclusions are selected from the group consisting of a fiber component, a hard component, and mixtures thereof.

12. A ductile pet chew comprising:
    (a) an amount of a polymeric material, wherein said polymeric material is ductile and is selected from the group consisting of protein based polymers, starch based polymers, synthetic polymers, and combinations thereof; and,
    (b) inclusions within said polymeric material, wherein said inclusion are selected from the group consisting of fiber components, hard components, and mixtures thereof, wherein said fiber components have a length of greater than 900 $\mu$.

13. The pet chew of claim 12, wherein said fiber components have a length ranging between 1,800 $\mu$ and 2,500 $\mu$.

14. The pet chew of claim 12, wherein said polymeric material is said protein based polymer.

15. The pet chew of claim 14, wherein said protein based polymer is derived from wheat, soy, corn, barley, other plant proteins, and combinations thereof.

16. The pet chew of claim 14, wherein said protein polymer has a water activity equal to less than 0.9.

17. The pet chew of claim 12, wherein said polymeric material is said synthetic polymer.

18. The pet chew of claim 12, wherein said polymeric material is said starch based polymer.

19. The pet chew of claim 18, wherein said starch based polymer is derived from wheat, rice, tapioca, potato, corn, and combinations thereof.

20. The pet chew of claim 12, wherein said inclusions are said fiber components.

21. The pet chew of claim 20, wherein said fiber components are selected from the group consisting of synthetic fibers, cellulose, sisal, cotton, and combinations thereof.

22. The pet chew of claim 20, wherein said fiber component is added in an amount ranging between 1% and 15% by weight of said polymeric material.

23. The pet chew of claim 22, wherein said fiber component is added in an amount ranging between 4% and 8% by weight of said polymeric material.

24. The pet chew of claim 12, wherein said inclusions are said hard components.

25. The pet chew of claim 24, wherein said hard component is selected from the group consisting of whole grains, ground grains, processed grains, legumes, minerals, and combinations thereof.

26. The pet chew of claim 24, wherein said hard component is added in an amount ranging between 5% and 45% by weight of said polymeric material.

27. The pet chew of claim 34, wherein said hard components have a hardness equal to at least 0.5 Mahs.

28. The pet chew of claim 12, wherein said polymeric material includes a humectant.

29. The pet chew of claim 12, wherein said chew is extruded, co-extruded, rotary molded, sheeted, or injection molded.

30. The pet chew of claim 12, wherein said chew has a total moisture content equal to less than 25% by weight.

31. The pet chew of claim 12, wherein said polymeric material is edible, digestible, and doesn't dissolve in water.

32. The pet chew of claim 31, wherein said hard component is added in an amount ranging between 10% and 25% by weight of said polymeric material.

33. The pet chew of claim 12, wherein said chew has a tensile strength ranging between 200 psi and 1,050 psi, flexural strength ranging between 3 lbs. and 75 lbs., shear strength ranging between 80 lbs. and 175 lbs., hardness between 68 and 90, and penetration between 2 and 28.

34. The pet chew of claim 12, wherein said polymeric material is equal to between 50% and 95% by weight of said chew.

* * * * *

UNITED STATES PATENT AND TRADEMARK OFFICE
CERTIFICATE OF CORRECTION

PATENT NO. : 6,672,252 B2
DATED : January 6, 2004
INVENTOR(S) : Mark Levin and Joel S. Adamson It is certified that error appears in the above-identified patent and that said Letters Patent is hereby corrected as shown below:

<u>Column 16,</u>
Line 4, delete "34", and insert -- 24 -- therefor.

Signed and Sealed this

Sixth Day of July, 2004

JON W. DUDAS
*Acting Director of the United States Patent and Trademark Office*